United States Patent
Huntzicker et al.

(10) Patent No.: US 10,436,315 B2
(45) Date of Patent: Oct. 8, 2019

(54) SYSTEMS AND METHODS FOR CONTROLLING AN ENGINE AND HAZARD LIGHTS BASED ON START/STOP SWITCH ACTUATION

(71) Applicant: GM Global Technology Operations LLC, Detroit, MI (US)

(72) Inventors: Fred W. Huntzicker, Ann Arbor, MI (US); Pratyush Kumar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 15/637,504

(22) Filed: Jun. 29, 2017

(65) Prior Publication Data

US 2019/0003582 A1    Jan. 3, 2019

(51) Int. Cl.
| | | |
|---|---|---|
| *B60K 28/06* | (2006.01) | |
| *F16H 61/02* | (2006.01) | |
| *B60K 28/16* | (2006.01) | |
| *B60W 10/10* | (2012.01) | |
| *B60W 30/14* | (2006.01) | |
| *F02N 11/08* | (2006.01) | |
| *B60W 10/06* | (2006.01) | |
| *B60W 10/18* | (2012.01) | |

(Continued)

(52) U.S. Cl.
CPC ......... *F16H 61/0213* (2013.01); *B60K 28/16* (2013.01); *B60W 10/10* (2013.01); *B60W 30/143* (2013.01); *F02N 11/0822* (2013.01); *B60W 10/06* (2013.01); *B60W 10/18* (2013.01); *B60W 2520/28* (2013.01); *B60W 2710/105* (2013.01); *F02D 41/182* (2013.01); *F02D 41/22* (2013.01); *F02N 2200/0801* (2013.01)

(58) Field of Classification Search
CPC ..... F16H 61/0213; B60K 28/16; B60K 28/00; B60K 28/02; B60K 28/06; B60K 28/066; B60K 28/14; B60W 10/10; B60W 30/143; B60W 10/06; B60W 10/18; B60W 2520/28; B60W 2710/105; B60W 2540/06; B60W 2540/10; B60W 2540/103; B60W 2540/106; B60W 2540/12; F02N 11/0822; F02N 2200/0801; F02D 41/182; F02D 41/22; B60Q 1/44; B60Q 1/46
USPC ............................... 701/84, 70, 93; 340/471
See application file for complete search history.

(56) References Cited

U.S. PATENT DOCUMENTS

| | | | | |
|---|---|---|---|---|
| 4,807,101 A | * | 2/1989 | Milde, Jr. ................ | B60Q 1/46 340/472 |
| 6,229,438 B1 | * | 5/2001 | Kutlucinar ............... | B60Q 1/46 340/438 |

(Continued)

*Primary Examiner* — Richard A Goldman (57) ABSTRACT

A torque request module is configured to, while a vehicle speed is greater than a predetermined speed, decrease a torque request in response to a first signal from a start/stop switch being in a first state continuously for greater than a first predetermined period and less than a second predetermined period. A control module is configured to, as the torque request decreases, decrease torque output of at least one of an engine and an electric motor. A light control module is configured to: selectively turn exterior hazard lights on and off in response to a second signal from a hazard light switch being in a first state; and selectively turn the exterior hazard lights on and off in response to the first signal from the start/stop switch being in the first state continuously for greater than the first predetermined period.

20 Claims, 3 Drawing Sheets

(51) Int. Cl.
*F02D 41/18* (2006.01)
*F02D 41/22* (2006.01)

(56) References Cited

U.S. PATENT DOCUMENTS

| | | | | |
|---|---|---|---|---|
| 8,140,358 B1* | 3/2012 | Ling | ................... | G06Q 40/08 |
| | | | | 705/4 |
| 8,886,425 B2* | 11/2014 | Doering | ................... | B60K 6/48 |
| | | | | 701/55 |
| 2002/0195947 A1* | 12/2002 | Doczy | ................. | B60Q 1/1469 |
| | | | | 315/77 |
| 2007/0092771 A1* | 4/2007 | Wake | ................ | H01M 8/04179 |
| | | | | 429/414 |
| 2009/0212722 A1* | 8/2009 | Milne | ................. | B60Q 1/0088 |
| | | | | 315/314 |
| 2009/0293522 A1* | 12/2009 | Miyazaki | ............. | B60H 1/3205 |
| | | | | 62/231 |
| 2011/0213525 A1* | 9/2011 | Kanemoto | .......... | F02N 11/0825 |
| | | | | 701/31.4 |
| 2012/0215392 A1* | 8/2012 | Hashimoto | ........... | B60W 10/02 |
| | | | | 701/22 |
| 2012/0271508 A1* | 10/2012 | Kanemoto | .......... | F02N 11/0825 |
| | | | | 701/33.6 |
| 2014/0342875 A1* | 11/2014 | Tanida | ................ | B60W 10/182 |
| | | | | 477/115 |
| 2015/0073676 A1* | 3/2015 | Moennig | ................ | B60Q 1/448 |
| | | | | 701/70 |
| 2015/0203126 A1* | 7/2015 | Kobana | ................ | B60W 50/12 |
| | | | | 701/93 |
| 2015/0211466 A1* | 7/2015 | Puri | ....................... | F02N 11/08 |
| | | | | 701/22 |
| 2017/0008528 A1* | 1/2017 | Nakatsuka | ...... | B60W 30/18109 |
| 2017/0008534 A1* | 1/2017 | Nakatsuka | ............ | B60K 28/06 |
| 2017/0009691 A1* | 1/2017 | Nakatsuka | ................ | B62D 6/04 |
| 2017/0120887 A1* | 5/2017 | Kurahashi | ............... | B60Q 1/46 |
| 2017/0305440 A1* | 10/2017 | Oba | .................... | B60W 50/082 |
| 2019/0003582 A1* | 1/2019 | Huntzicker | ........... | B60K 28/16 |
| 2019/0070957 A1* | 3/2019 | Nakatsuka | ............. | B60K 28/06 |
| 2019/0071076 A1* | 3/2019 | Nakatsuka | ............. | B62D 6/003 |

* cited by examiner

SYSTEMS AND METHODS FOR CONTROLLING AN ENGINE AND HAZARD LIGHTS BASED ON START/STOP SWITCH ACTUATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for controlling hazard lights and startup and shutdown of an engine of a vehicle.

A vehicle includes an internal combustion engine that combusts air and fuel to generate torque. The engine outputs torque to a transmission. The transmission transfers torque to one or more wheels of the vehicle via a driveline. When the engine is off, the vehicle starts the engine in response to user input to start the engine. When the engine is on and the transmission is in park, the vehicle shuts down the engine in response to user input to shut down the vehicle.

The vehicle also includes hazard lights that are visible from outside of the vehicle. Some vehicles utilize brake lights or other lights of the vehicle to serve as hazard lights. However, other types of vehicles may have designated hazard lights. The vehicle turns its hazard lights on and off in response to user input indicative of a request to turn the hazard lights on and off. For example, the vehicle may turn its hazard lights on and off in response to a signal indicating that a hazard light switch of the vehicle has been actuated from a first position to a second position.

SUMMARY

In a feature, a hazard light control system of a vehicle is described. A torque request module is configured to, while a vehicle speed is greater than a predetermined speed, decrease a torque request in response to a first signal from a start/stop switch of the vehicle being in a first state continuously for greater than a first predetermined period and less than a second predetermined period. The second predetermined period is greater than the first predetermined period. A control module is configured to, as the torque request decreases, decrease torque output of at least one of an engine of the vehicle and an electric motor of the vehicle. A light control module is configured to: selectively turn exterior hazard lights of the vehicle on and off in response to a second signal from a hazard light switch of the vehicle being in a first state; and selectively turn the exterior hazard lights on and off in response to the first signal from the start/stop switch being in the first state continuously for greater than the first predetermined period.

In further features, the torque request module is further configured to, while the vehicle speed is greater than the predetermined speed, set the torque request to a predetermined torque to stop vehicle propulsion in response to the first signal from the start/stop switch being in the first state continuously for greater than the second predetermined period; and the control module is configured to stop rotation of the at least one of the engine and the electric motor when the torque request is set to the predetermined torque.

In further features, the light control module is further configured to continue turning the exterior hazard lights on and off in response to the first signal from the start/stop switch being in the first state continuously for greater than the second predetermined period.

In further features, the torque request module is further configured to, while the vehicle speed is greater than the predetermined speed, set the torque request to the predetermined torque to stop vehicle propulsion in response to the first signal from the start/stop switch transitioning from a second state to the first state at least a predetermined number of times within a predetermined period.

In further features, the predetermined number is an integer greater than two.

In further features: the torque request module is further configured to increase the torque request in response to the first signal from the start/stop switch transitioning from the first state to a second state before the first signal is continuously in the first state for greater than the second predetermined period; and the control module is further configured to, as the torque request increases, increase the torque output of the at least one of the engine and the electric motor.

In further features, the light control module is further configured to: continue turning on and off the exterior hazard lights when: the exterior hazard lights were being turned on and off prior to the first signal from the start/stop switch transitioning to the first state; and the first signal from the start/stop switch transitions from the first state to the second state before the first signal is continuously in the first state for greater than the second predetermined period; and maintain the exterior hazard lights off when: the exterior hazard lights were being maintained off prior to the first signal from the start/stop switch transitioning to the first state; and the first signal from the start/stop switch transitions from the first state to the second state before the first signal is continuously in the first state for greater than the second predetermined period.

In further features, the torque request module is configured to: decrease the torque request by up to a first predetermined torque each first predetermined period; and increase the torque request by up to a second predetermined torque each second predetermined period.

In further features, the predetermined speed is greater than zero.

In further features, the light control module is configured to, independently of the second signal from the hazard light switch, selectively turn the exterior hazard lights on and off in response to the first signal from the start/stop switch being in the first state continuously for greater than the first predetermined period.

In a feature, a method for controlling hazard lights of a vehicle includes: while a vehicle speed is greater than a predetermined speed, decreasing a torque request in response to a first signal from a start/stop switch of the vehicle being in a first state continuously for greater than a first predetermined period and less than a second predetermined period, where the second predetermined period is greater than the first predetermined period; as the torque request decreases, decreasing torque output of at least one of an engine of the vehicle and an electric motor of the vehicle; selectively turning exterior hazard lights of the vehicle on and off in response to a second signal from a hazard light switch of the vehicle being in a first state; and selectively turning the exterior hazard lights on and off in response to the first signal from the start/stop switch being in the first state continuously for greater than the first predetermined period.

In further features, the method further includes: while the vehicle speed is greater than the predetermined speed, setting the torque request to a predetermined torque to stop vehicle propulsion in response to the first signal from the start/stop switch being in the first state continuously for greater than the second predetermined period; and stopping rotation of the at least one of the engine and the electric motor when the torque request is set to the predetermined torque.

In further features, the method further includes continuing turning the exterior hazard lights on and off in response to the first signal from the start/stop switch being in the first state continuously for greater than the second predetermined period.

In further features, the method further includes, while the vehicle speed is greater than the predetermined speed, setting the torque request to the predetermined torque to stop vehicle propulsion in response to the first signal from the start/stop switch transitioning from a second state to the first state at least a predetermined number of times within a predetermined period.

In further features, the predetermined number is an integer greater than two.

In further features, the method further includes: increasing the torque request in response to the first signal from the start/stop switch transitioning from the first state to a second state before the first signal is continuously in the first state for greater than the second predetermined period; and as the torque request increases, increasing the torque output of the at least one of the engine and the electric motor.

In further features, the method further includes: continuing turning on and off the exterior hazard lights when: the exterior hazard lights were being turned on and off prior to the first signal from the start/stop switch transitioning to the first state; and the first signal from the start/stop switch transitions from the first state to the second state before the first signal is continuously in the first state for greater than the second predetermined period; and maintaining the exterior hazard lights off when: the exterior hazard lights were being maintained off prior to the first signal from the start/stop switch transitioning to the first state; and the first signal from the start/stop switch transitions from the first state to the second state before the first signal is continuously in the first state for greater than the second predetermined period.

In further features: decreasing the torque request includes decreasing the torque request by up to a first predetermined torque each first predetermined period; and increasing the torque request includes increasing the torque request by up to a second predetermined torque each second predetermined period.

In further features, the predetermined speed is greater than zero.

In further features, selectively turning the exterior hazard lights on and off includes, independently of the second signal from the hazard light switch, selectively turning the exterior hazard lights on and off in response to the first signal from the start/stop switch being in the first state continuously for greater than the first predetermined period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a start/stop button that the driver may push or actuate to input a request to start or shut down a vehicle. For example, while the vehicle is shut down, the driver may actuate the start/stop button to request that the vehicle be started. While the vehicle is on, the driver may actuate the start/stop button to request that the vehicle be shut down.

Actuation of the start/stop button while the vehicle is moving, however, may or may not be intended by the driver. According to the present disclosure, in response to actuation of the start/stop button to a predetermined state continuously for at least a first predetermined period while the vehicle is moving, a control module of the vehicle decreases torque output. The torque output decreases causes the vehicle to decelerate. The control module also turns exterior hazard lights of the vehicle on and off while the torque output is decreased without the driver actuating a hazard light button.

The deceleration may cause the driver to release the start/stop button. If the driver maintains the depression of the start/stop button continuously for at least a second predetermined period, the control module may shut down the vehicle and continue turning the exterior hazard lights on and off. If the driver releases the start/stop button before the second predetermined period has passed, however, the control module aborts the decrease in the torque output. This allows the driver to return to normal operation without shutting off the vehicle. The control module may also maintain the hazard lights off if the hazard lights were off before the driver began to depress the start/stop button.

Figure 1:
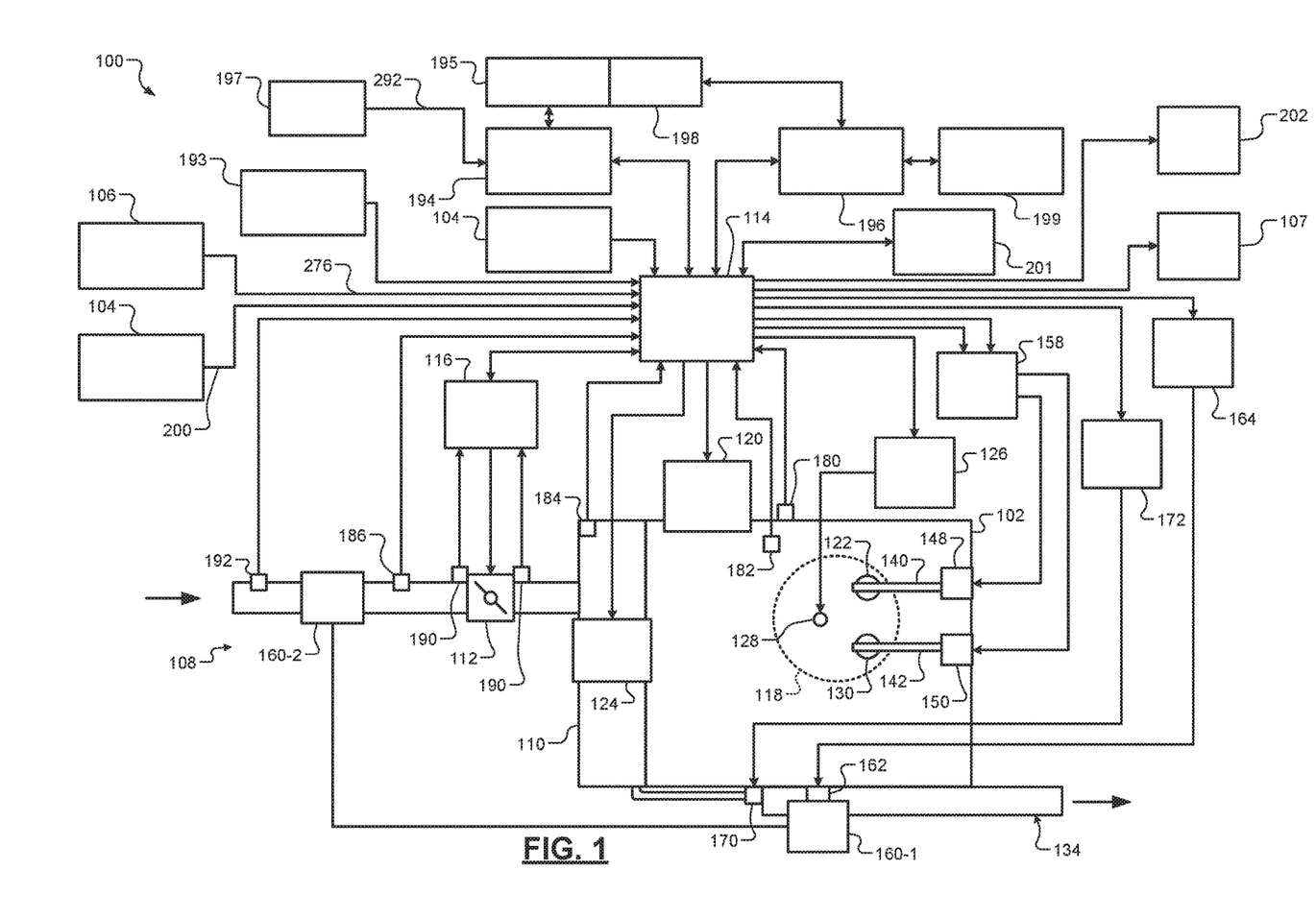
FIG. 1 is a functional block diagram of an example powertrain system of a vehicle.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous. The vehicle also includes a start/stop switch 104 that is actuatable to input requests to start the engine 102 and requests to shut down the vehicle. The vehicle also includes a hazard light switch 106 that is actuatable to input requests to maintain hazard lights 107 of the vehicle off and requests to turn the hazard lights 107 on and off at a predetermined rate. The hazard lights 107 are located on the exterior of the vehicle.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184.

In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors.

An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The transmission control module 194 shifts the transmission 195, for example, based on signals from a transmission range selector 197. The transmission range selector 197 may include one or more buttons and/or actuators for selecting, for example, park, reverse, neutral, drive, manual, upshift, downshift, etc. Examples of actuators include, for example, rotary transmission range selectors, levers, joysticks, and other types of actuatable transmission range selectors.

The ECM 114 may communicate with a hybrid control module 196, for example, to coordinate operation of the engine 102 and an electric motor 198. While the example of one electric motor is provided, multiple electric motors may be implemented. The electric motor and motor generator unit (MGU) may be interchangeable in the context of the present application, drawings, and claims. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 199 to the electric motor 198 to cause the electric motor 198 to output positive torque. While the example of the battery 199 is provided, more than one battery may be used to supply power to the electric motor 198. The electric motor 198 may output torque, for example, to the engine 102, to an input shaft of the transmission 195, to an output shaft of the transmission 195, or to another torque transfer device of the powertrain of the vehicle. The battery 199 may be dedicated for the electric motor 198 and one or more other batteries may supply power for other vehicle functions.

Under other circumstances, the hybrid control module 196 may control the electric motor 198 to convert mechanical energy of the vehicle into electrical energy. The hybrid control module 196 may control the electric motor 198 to convert mechanical energy into electrical energy, for example, to recharge the battery 199. This may be referred to as regeneration.

When the engine 102 is shut down (off and not running), the ECM 114 starts the engine 102 when a start/stop (S/S) signal 200 from the start/stop switch 104 is in a first state. The start/stop switch 104 may set the start/stop signal 200 to the first state when the start/stop switch 104 is actuated (e.g., depressed) to a first position. The start/stop switch 104 may set the start/stop signal 200 to a second state when the start/stop switch 104 is not actuated (e.g., not depressed) and is in a second position.

The ECM 114 may start the engine 102, for example, by engaging a starter motor with the engine 102 and applying power to the starter motor. The starter motor rotates when power is applied to the starter motor. Rotation of the starter motor when the starter motor is engaged with the engine 102 causes rotation (cranking) of the crankshaft of the engine 102. While the engine 102 rotates, the ECM 114 selectively supplies fuel to the cylinders for combustion, thereby starting the engine 102. In various implementations, the electric motor 198 may be used to start the engine 102.

When the engine 102 is running and the transmission 195 is in park, the ECM 114 selectively shuts down the engine 102 when the start/stop signal 200 from the start/stop switch 104 is in the first state for a predetermined period. Shutting down the engine 102 includes the ECM 114 disabling fueling of the engine 102 to discontinue combustion within the engine 102. Without combustion, the crankshaft stops rotating and the engine 102 shuts down. While the example of the ECM 114 starting the engine 102 is provided, another control module of the vehicle, such as a body control module (BCM) 201, may start the engine 102.

Under some circumstances, however, the driver does not intend to shut down the vehicle when the start/stop signal 200 from the start/stop switch 104 is in the first state while the vehicle is moving. For example, the start/stop switch 104 may be accidentally actuated via an object, the driver, or another passenger of the vehicle while the vehicle is moving.

According to the present disclosure, the ECM 114 decreases the torque output of the engine 102 when the start/stop signal 200 from the start/stop switch 104 is in the first state for a first predetermined period while the vehicle is moving. The ECM 114 also turns the hazard lights 107 on and off (independently of signals from the hazard light switch 106) at a predetermined rate when the start/stop signal 200 from the start/stop switch 104 is in the first state for the first predetermined period while the vehicle is moving. While the example of the ECM 114 turning the hazard lights 107 on and off is provided, another control module of the vehicle, such as the BCM 201, may control the hazard lights 107. Also, while the example of changing torque output of the engine 102 and shutting down the engine 102 is provided herein, the present application is more generally applicable to adjusting torque output of a torque producer (e.g., the engine 102, one or more electric motors, etc.) based on actuation of the start/stop switch 104 and shutting down the vehicle.

The ECM 114 may also generate a predetermined audible and/or visual output for the driver to continue to actuate the start/stop switch 104 to shut down the vehicle. For example, the ECM 114 may display a predetermined message for the driver to continue to actuate the start/stop switch 104 to shut down the vehicle on a display 202 and/or output the predetermined message for the driver to continue to actuate the start/stop switch 104 to shut down the vehicle via one or more speakers of the vehicle. While the example of the ECM 114 generating the predetermined audible and/or visual output is provided, another control module of the vehicle, such as an infotainment module, may control audible and/or visual output.

When the start/stop signal 200 stays in the first state continuously for a second predetermined period while the vehicle is moving, the ECM 114 shuts down the engine. The second predetermined period is greater than the first predetermined period. If the start/stop signal 200 from the start/stop switch 104 transitions to the second state, however, the ECM 114 disables the torque output decrease. In this way, if the driver releases the start/stop switch 104 before the passing of the second predetermined period, the ECM 114 allows normal engine operation to resume without shutting down the engine 102.

The ECM 114 may also turn the hazard lights 107 off if the hazard lights 107 were off prior to turning on and off of the hazard lights 107 pursuant to the start/stop signal 200 being in the first state for the first predetermined period. If the ECM 114 was turning the hazard lights 107 on and off prior to the start/stop signal 200 being in the first state for the first predetermined period, the ECM 114 may continue turning the hazard lights 107 on and off at the predetermined rate.

Figure 2:
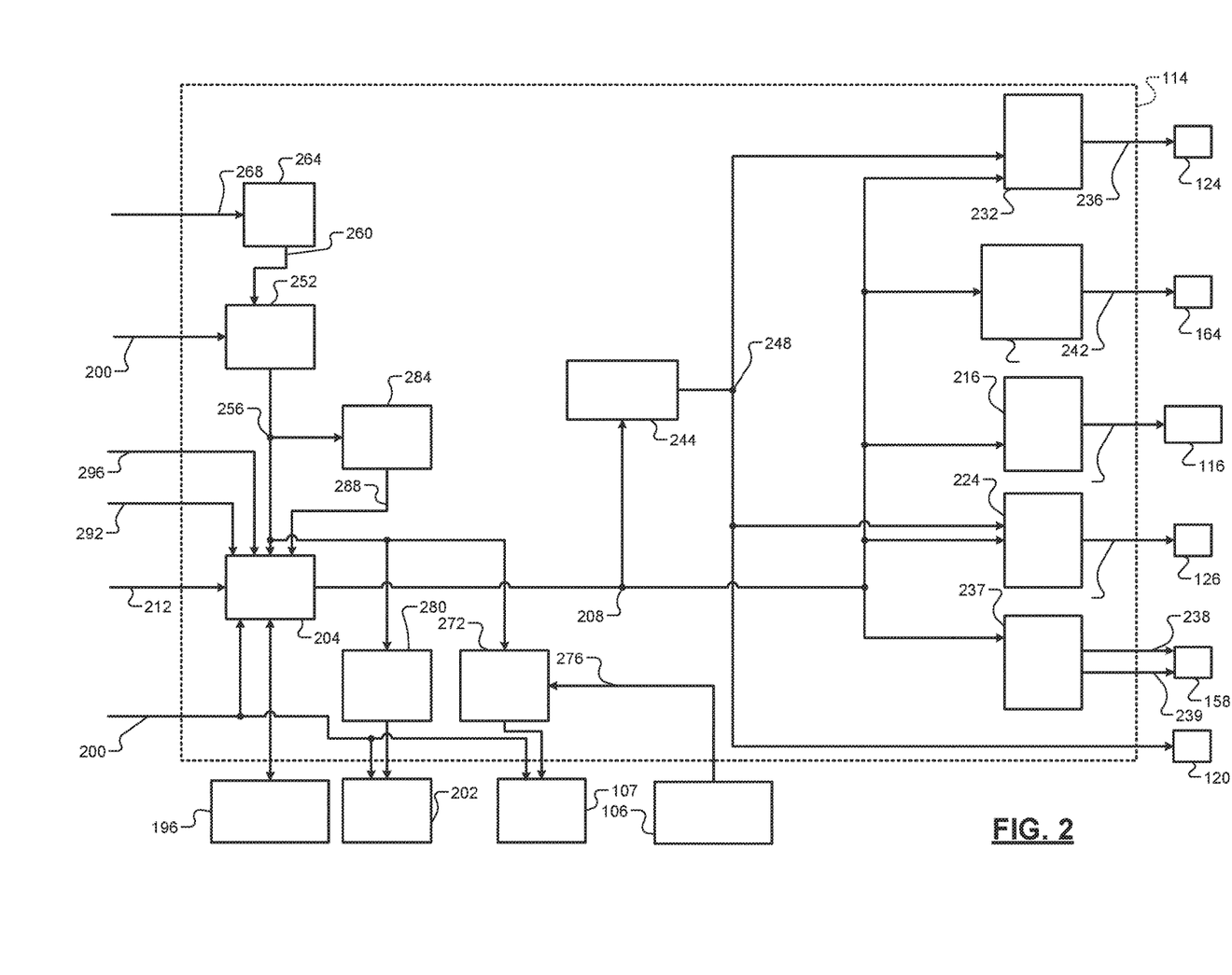
FIG. 2 is a functional block diagram of an example engine and light control system.

Referring now to FIG. 2, a functional block diagram of an example engine and light control system is presented. A torque request module 204 determines a torque request 208 for the engine 102 based on one or more driver inputs 212. The driver inputs 212 may include, for example, an APP, a BPP, a cruise control input, and/or one or more other suitable driver inputs. For example, the torque request 208 may increase as the APP increases (relative to a predetermined resting APP) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

The ECM 114 controls one or more engine actuators based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220. For example only, the throttle control module 216 may increase the target throttle opening 20 as the torque request 208 increases and vice versa.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include a target equivalence ratio (EQR), number of fuel injections per combustion event, and timing for each of the injections. The fuel actuator module 124 injects fuel based on the target fueling parameters 236. Generally speaking, airflow into the cylinders (e.g., a mass of air trapped within each cylinder) increases as the torque request 208 increases and vice versa. At a given target EQR, the fuel control module 232 generally increases fueling (e.g., a mass of fuel provided to each cylinder) as airflow into the cylinders increases and vice versa.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A wastegate control module 240 sets a target wastegate opening 242 based on the torque request 208. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates cylinder activation/deactivation commands 248 based on the torque request 208. The cylinder actuator module 120 deactivates the intake and exhaust valves of the cylinders based on the activation/deactivation commands 248.

The fuel control module 232 halts fueling of deactivated cylinders. The fuel control module 232 sets the target fueling parameters 236 to provide fuel to activated cylinders. The spark control module 224 may provide spark to activated cylinders and may provide or halt spark to deactivated cylinders.

Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed. The fuel control module 232 may cutoff fuel to one, more than one, or all of the cylinders of the engine, for example, during vehicle deceleration. This may decrease fuel consumption of the engine 102.

While the vehicle is moving, a timer module 252 increments a timer value when the start/stop signal 200 from the start/stop switch 104 is in the first state and the vehicle is moving. The start/stop switch 104 sets the start/stop signal 200 to the first state when the start/stop switch 104 is actuated (e.g., depressed) to the first position. The timer module 252 resets the timer value (e.g., to zero) when at least one of: the start/stop signal 200 is in the second state; and the vehicle is not moving. The start/stop switch 104 sets the start/stop signal 200 to the second state when the start/stop switch 104 is not actuated (e.g., not depressed) and is in the second position. The timer value therefore tracks a period that the start/stop switch 104 has continuously been in the first position since the start/stop switch 104 was last actuated to the first position while the vehicle has been moving. In other words, the timer value tracks the period that the start/stop switch 104 has been actuated while the vehicle has been moving. This period will be referred to as a held period 256.

When the held period 256 is less than a first predetermined period, the torque request module 204 determines the torque request 208 based on the driver inputs 212, as discussed above. When the held period 256 is greater than the first predetermined period but less than a second predetermined period, the torque request module 204 decreases the torque request 208 toward zero at a first predetermined rate (e.g., first predetermined torque per predetermined period). The torque request module 204 begins decreasing the torque request at the first predetermined rate when the held period 256 becomes greater than the first predetermined period. The torque request module 204 may, for example, subtract a first predetermined torque each predetermined period, such as each control loop. This may ramp or step-wise decrease the torque request 208 toward zero at the first predetermined rate. The vehicle decelerates in response to the decrease in the torque request 208. The first predetermined rate may be calibratable and may be set based on causing a predetermined deceleration of the vehicle that may be noticeable by a driver of the vehicle.

The second predetermined period is greater than the first predetermined period, and the first and second predetermined periods are calibratable. For example only, the first predetermined period may be 100 milliseconds and the second predetermined period may be 2 seconds. However, the first and second predetermined periods may be other suitable periods.

When the torque request 208 is zero or less than a predetermined shutdown torque, the hybrid control module 196, the fuel control module 232, the wastegate control module 240, the throttle control module 216, the spark control module 224, and the phaser control module 237 may control the respective engine actuators to shut down the vehicle. The predetermined shutdown torque may be less than a minimum engine torque output to maintain the engine 102 running and may correspond to zero vehicle propulsion.

The timer module 252 may determine whether the vehicle is moving based on a vehicle speed (VS) 260. For example, the timer module 252 may determine that the vehicle is moving when the vehicle speed 260 is greater than a predetermined speed. The timer module 252 may determine that the vehicle is not moving when the vehicle speed 260 is less than the predetermined speed. The predetermined speed may be calibratable and may be, for example, approximately 5 kilometers per hour (kph) or another suitable speed.

A vehicle speed module 264 may determine the vehicle speed 260. For example, the vehicle speed module 264 may determine the vehicle speed 260 based on one or more wheel speeds (WSes) 268 measured using wheel speed sensors. For example only, the vehicle speed module 264 may set the vehicle speed 260 based on or equal to an average of one or more of the wheel speeds. One wheel speed sensor may be provided for each wheel of the vehicle.

When the held period 256 is less than the first predetermined period, a light control module 272 controls illumination of the hazard lights 107 based on whether a hazard light signal 276 from the hazard light switch 106 is in the first state or the second state. For example, the light control module 272 maintains the hazard lights 107 off when the hazard light signal 276 is in the second state, indicating that the hazard light switch 106 has not been actuated. The light control module 272 turns the hazard lights 107 on and off at a predetermined rate when the hazard light signal 276 is in the first state, indicating that the hazard light switch 106 has been actuated.

When the held period 256 is greater than the first predetermined period but less than the second predetermined period, the light control module 272 turns the hazard lights 107 on and off at the predetermined rate. When the held period 256 is greater than the first predetermined period but less than the second predetermined period, an output control module 280 outputs an audible and/or visual request for the driver to continue to actuate the start/stop switch 104 to shut down the vehicle. For example, the output control module 280 may display the request on the display 202. Additionally or alternatively, the output control module 280 may audibly output the request via speakers of the vehicle.

When the start/stop signal 200 transitions from the first state to the second state while the held period 256 is greater than the first predetermined period and less than the second predetermined period, the torque request module 204 increases, at a second predetermined rate (e.g., a second predetermined torque per predetermined period), the torque request 208 toward a torque request determined based on the driver inputs 212. The torque request module 204 begins increasing the torque request 208 at the second predetermined rate when the start/stop signal 200 transitions to the second state. The torque request module 204 may, for example, add a second predetermined torque each predetermined period, such as each control loop, until the torque request 208 reaches the torque request determined based on the driver inputs 212. This may ramp or step-wise increase the torque request 208 toward zero at the second predetermined rate. The second predetermined rate may be calibratable. The second predetermined rate may be equal to (in magnitude) or different than the first predetermined rate.

When the start/stop signal 200 transitions from the first state to the second state while the held period 256 is greater than the first predetermined period and less than the second predetermined period, the output control module 280 may stop outputting the request. When the start/stop signal 200 transitions from the first state to the second state while the held period 256 is greater than the first predetermined period and less than the second predetermined period, the light control module 272 may maintain the hazard lights 107 off if the hazard lights 107 were off (based on the hazard light signal 276 being in the second state) before the held period 256 became greater than the first predetermined period. If the hazard lights 107 were being turned on and off (based on the hazard light signal 276 being in the first state) before the held period 256 became greater than the first predetermined period, the light control module 272 may continue to turn the hazard lights 107 on and off at the predetermined rate.

When the held period 256 is greater than the second predetermined period, the torque request module 204 decreases the torque request 208 to zero or to the predetermined shutdown torque to shut down the vehicle and stop vehicle propulsion. As stated above, when the torque request 208 is zero or equal to the predetermined shutdown torque, the fuel control module 232, the wastegate control module 240, the throttle control module 216, the spark control module 224, and the phaser control module 237 may control the respective engine actuators to shut down the engine 102. For example, the fuel control module 232 may disable fueling of the engine 102 and the spark control module 224 discontinues providing spark to allow the crankshaft to slow to a stop. Additionally or alternatively, the hybrid control module 196 may disable power flow to the electric motor 198 to slow and stop the vehicle.

When the held period 256 is greater than the second predetermined period, the light control module 272 continues turning the hazard lights 107 on and off at the predetermined rate. In this way, actuation of the start/stop switch 104, in addition to causing the vehicle to decelerate and/or the engine 102 to shut down, actuation of the start/stop switch 104 also initiates the turning on and off of the hazard lights 107, independently of actuation of the hazard light switch 106.

While the output control module 280 and the light control module 272 are shown and discussed in conjunction with the example of being implemented within the ECM 114, the output control module 280 and/or the light control module 272 may be implemented separately or within another module of the vehicle. For example, the light control module 272 may be implemented within the BCM 201. The output control module 280 may be implemented within an infotainment module of the vehicle.

A counter module 284 may count a number 288 of short actuations of the start/stop switch 104 that occur during a predetermined period prior to a present time. The counter module 284 may determine that a short actuation of the start/stop switch 104 has occurred, for example, when the held period 256 increases (e.g., away from zero) and next resets (e.g., to zero) before the held period 256 becomes greater than the first predetermined period. Alternatively, the counter module 284 may determine that a short actuation of the start/stop switch 104 has occurred, for example, when the start/stop signal 200 is in the first state for less than a third predetermined period (that is less than the first predetermined period) before transitioning back to the second state.

The torque request module 204 may decrease the torque request 208 to zero or to the predetermined shutdown torque to shut down the vehicle under other circumstances. For example, the torque request module 204 may decrease the torque request 208 to zero or to the predetermined shutdown torque when, while the vehicle is moving and the transmission 195 is not in park, at least one of: the number 288 of short actuations is greater than a first predetermined number; and a period that the start/stop signal 200 is continuously in the first state is greater than a fourth predetermined period. The first predetermined number and the fourth predetermined period may be calibratable. For example only, the first predetermined number may be approximately 5 or another suitable integer greater than one. The fourth predetermined period may be greater than the second predetermined period and may be, for example, approximately 3 seconds or another suitable period. The torque request module 204 may determine whether the transmission 195 is in park or not based on a range selector signal 292 from the transmission range selector 197.

Additionally or alternatively, the torque request module 204 may decrease the torque request 208 to zero or to the predetermined shutdown torque when, while the vehicle is moving following a time when the BCM 201 was close to deploying one or more airbags of the vehicle, at least one of: the number 288 of short actuations is greater than a second predetermined number; and a period that the start/stop signal 200 is continuously in the first state is greater than a fifth predetermined period. The second predetermined number and the fifth predetermined period may be calibratable. For example only, the second predetermined number may be approximately 7 or another suitable integer that is greater than one and greater than the first predetermined number. The fifth predetermined period may be greater than the fourth predetermined period and may be, for example, approximately 4 seconds or another suitable period.

The BCM 201 may generate a deployment signal 296 that indicates whether the BCM 201 was near deploying the one or more airbags of the vehicle. The BCM 201 may generate the deployment signal 296 after at least one of: a lateral acceleration of the vehicle is greater than a predetermined acceleration; a longitudinal acceleration of the vehicle is greater than a predetermined acceleration; and a roughness value of the road under the vehicle is greater than a predetermined value.

Figure 3:
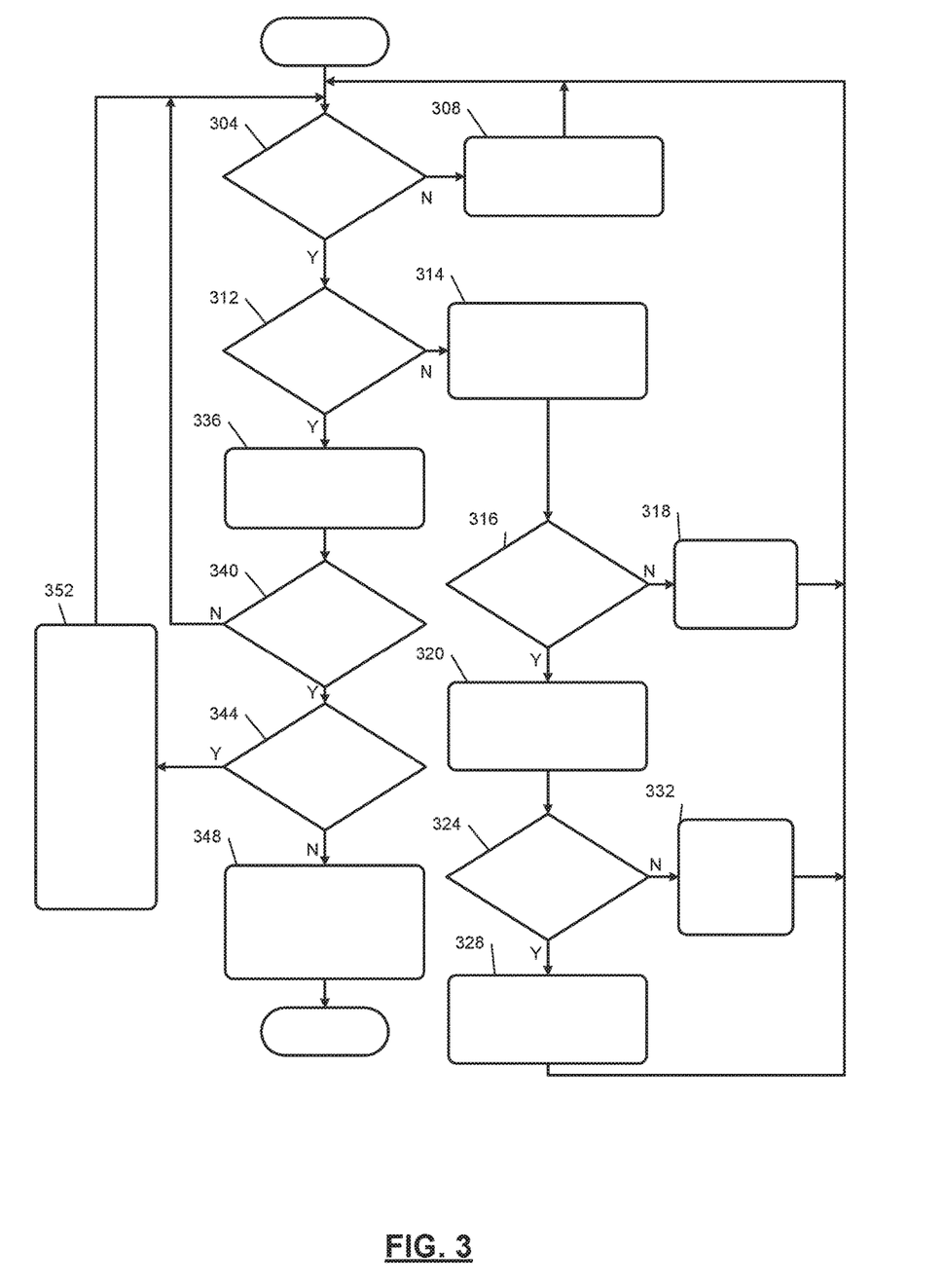
FIG. 3 is a flowchart depicting an example method of controlling an engine and hazard lights based on actuation of a start/stop switch.

FIG. 3 is a flowchart depicting an example method of controlling the engine 102 and the hazard lights based on actuation of the start/stop switch 104. Control begins with 304 when the engine 102 is running. At 304, the timer module 252 determines whether the vehicle is moving. For example, the vehicle speed module 264 may determine the vehicle speed 260 and the timer module 252 may determine whether the vehicle speed 260 is greater than the predetermined speed. If 304 is false, the timer module 252 may reset the held period 256 to a predetermined reset value (e.g., to zero) at 308, and control may return to 304. If 304 is true, control continues with 312.

At 312, the timer module 252 may determine whether the start/stop signal 200 from the start/stop switch 104 is in the first state. The start/stop switch 104 sets the start/stop signal 200 to the first state when the start/stop switch 104 is actuated to the first position. The start/stop switch 104 sets the start/stop signal 200 to the second state when the start/stop switch 104 is in the second (resting) position and is not being actuated. If 312 is false, control transfers to 314. If 312 is true, control continues with 336, which is discussed further below.

At 314, the timer module 252 resets the held period 256 to the predetermined reset value, and the torque request module 204 determines a torque request based on the driver inputs 212. At 316, the torque request module 204 determines whether the torque request 208 is less than the determined torque request due to a reduction in the torque request 208 performed in response to the held period 256 being greater than the first predetermined period at 352, which is discussed further below. If 316 is false, at 318, the torque request module 204 sets the torque request to the determined torque request and the output control module 280 does not output an audio and/or visual request for the driver to continue to hold the start/stop switch 104 in the first position to shut down the vehicle. The throttle control module 216, the spark control module 224, the phaser control module 237, the fuel control module 232, and/or the wastegate control module 240 control the respective engine actuators based on the torque request 208. Additionally or alternatively, the hybrid control module 196 controls application of power to the electric motor 198 based on the torque request 208. Control then returns to 304. If 316 is true, control continues with 320.

At 320, the torque request module 204 increases the torque request 208 toward the determined torque request based on the second predetermined rate. More specifically, the torque request module 204 increases the torque request 208 by up to the second predetermined torque. If the torque request 208 is less than the determined torque request by less than or equal to the second predetermined torque, the torque request module 204 may set the torque request 208 equal to the determined torque request. If the torque request 208 is less than the determined torque request by more than the second predetermined torque, the torque request module 204 may set the torque request 208 based on or equal to the torque request plus the second predetermined torque. Also at 320, the output control module 280 does not output an audio and/or visual request for the driver to continue to hold the start/stop switch 104 in the first position to shut down the vehicle.

At 324, the light control module 272 may determine whether the hazard lights 107 were being turned on and off at the predetermined rate in response to user actuation of the hazard light switch 106 prior to the reduction in the torque request 208 performed in response to the held period 256 being greater than the first predetermined period at 352. If 324 is true, the light control module 272 stops turning the hazard lights 107 on and off and maintains the hazard lights 107 off at 328. Control may return to 304. If 324 is false, the light control module 272 continues turning the hazard lights 107 on and off until the hazard light switch 106 is actuated at 332, and control may return to 304.

Referring back to 336, when the start/stop signal 200 is in the first state at 312, the timer module 252 increments the held period 256 at 336. For example, the timer module 252 may set the held period 256 equal to the held period 256 plus a predetermined period. At 340, the torque request module 204 may determine whether the held period 256 is greater than the first predetermined period (e.g., 100 milliseconds). If 340 is true, control continues with 344. If 340 is false, the torque request module 204 sets the torque request 208 based on the driver inputs 212, and control returns to 304. The throttle control module 216, the spark control module 224, the phaser control module 237, the fuel control module 232, and/or the wastegate control module 240 control the respective engine actuators based on the torque request 208. Additionally or alternatively, the hybrid control module 196 controls application of power to the electric motor 198 based on the torque request 208.

At 344, the torque request module 204 determines whether the held period 256 is less than the second predetermined period (e.g., 2 seconds). If 344 is false, the torque request module 204 sets the torque request 208 to zero or to the predetermined shutdown torque at 348, thereby shutting down the vehicle, and the light control module 272 continues turning the hazard lights 107 on and off at the predetermined rate. Control may then end until a next startup of the vehicle. If 344 is true, control transfers to 352.

At 352, the torque request module 204 decreases the torque request 208 (relative to the torque request 208 from the last control loop) based on the first predetermined rate. More specifically, the torque request module 204 decreases the torque request 208 (relative to the torque request 208 from the last control loop) by up to the first predetermined torque. For example, the torque request module 204 may set the torque request 208 equal to the torque request from the last control loop minus the first predetermined torque. Also at 352, the output control module 280 outputs an audio and/or visual request for the driver to continue to hold the start/stop switch 104 in the first position to shut down the vehicle. The light control module 272 also turns the hazard lights 107 on and off at the predetermined rate at 352. Control then returns to 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A hazard light control system of a vehicle, comprising:
    a torque request module that is configured to, while a vehicle speed is greater than a predetermined speed, decrease a torque request in response to a first signal from a start/stop switch of the vehicle being in a first state continuously for greater than a first predetermined period and less than a second predetermined period, wherein the second predetermined period is greater than the first predetermined period;
    a control module configured to, as the torque request decreases, decrease torque output of at least one of an engine of the vehicle and an electric motor of the vehicle; and
    a light control module configured to:
        selectively turn exterior hazard lights of the vehicle on and off in response to a second signal from a hazard light switch of the vehicle being in a first state; and
        selectively turn the exterior hazard lights on and off in response to the first signal from the start/stop switch being in the first state continuously for greater than the first predetermined period.

2. The hazard light control system of claim 1 wherein:
    the torque request module is further configured to, while the vehicle speed is greater than the predetermined speed, set the torque request to a predetermined torque to stop vehicle propulsion in response to the first signal from the start/stop switch being in the first state continuously for greater than the second predetermined period; and
    the control module is configured to stop rotation of the at least one of the engine and the electric motor when the torque request is set to the predetermined torque.

3. The hazard light control system of claim 2 wherein the light control module is further configured to continue turning the exterior hazard lights on and off in response to the first signal from the start/stop switch being in the first state continuously for greater than the second predetermined period.

4. The hazard light control system of claim 2 wherein the torque request module is further configured to, while the vehicle speed is greater than the predetermined speed, set the torque request to the predetermined torque to stop vehicle propulsion in response to the first signal from the start/stop switch transitioning from a second state to the first state at least a predetermined number of times within a predetermined period.

5. The hazard light control system of claim 4 wherein the predetermined number is an integer greater than two.

6. The hazard light control system of claim 2 wherein:
    the torque request module is further configured to increase the torque request in response to the first signal from the start/stop switch transitioning from the first state to a second state before the first signal is continuously in the first state for greater than the second predetermined period; and the control module is further configured to, as the torque request increases, increase the torque output of the at least one of the engine and the electric motor.

7. The hazard light control system of claim 6 wherein the light control module is further configured to:
continue turning on and off the exterior hazard lights when:
the exterior hazard lights were being turned on and off prior to the first signal from the start/stop switch transitioning to the first state; and
the first signal from the start/stop switch transitions from the first state to the second state before the first signal is continuously in the first state for greater than the second predetermined period; and
maintain the exterior hazard lights off when:
the exterior hazard lights were being maintained off prior to the first signal from the start/stop switch transitioning to the first state; and
the first signal from the start/stop switch transitions from the first state to the second state before the first signal is continuously in the first state for greater than the second predetermined period.

8. The hazard light control system of claim 6 wherein the torque request module is configured to:
decrease the torque request by up to a first predetermined torque each first predetermined period; and
increase the torque request by up to a second predetermined torque each second predetermined period.

9. The hazard light control system of claim 1 wherein the predetermined speed is greater than zero.

10. The hazard light control system of claim 1 wherein the light control module is configured to, independently of the second signal from the hazard light switch, selectively turn the exterior hazard lights on and off in response to the first signal from the start/stop switch being in the first state continuously for greater than the first predetermined period.

11. A method for controlling hazard lights of a vehicle, the method comprising:
while a vehicle speed is greater than a predetermined speed, decreasing a torque request in response to a first signal from a start/stop switch of the vehicle being in a first state continuously for greater than a first predetermined period and less than a second predetermined period,
wherein the second predetermined period is greater than the first predetermined period;
as the torque request decreases, decreasing torque output of at least one of an engine of the vehicle and an electric motor of the vehicle;
selectively turning exterior hazard lights of the vehicle on and off in response to a second signal from a hazard light switch of the vehicle being in a first state; and
selectively turning the exterior hazard lights on and off in response to the first signal from the start/stop switch being in the first state continuously for greater than the first predetermined period.

12. The method of claim 11 further comprising:
while the vehicle speed is greater than the predetermined speed, setting the torque request to a predetermined torque to stop vehicle propulsion in response to the first signal from the start/stop switch being in the first state continuously for greater than the second predetermined period; and
stopping rotation of the at least one of the engine and the electric motor when the torque request is set to the predetermined torque.

13. The method of claim 12 further comprising continuing turning the exterior hazard lights on and off in response to the first signal from the start/stop switch being in the first state continuously for greater than the second predetermined period.

14. The method of claim 12 further comprising, while the vehicle speed is greater than the predetermined speed, setting the torque request to the predetermined torque to stop vehicle propulsion in response to the first signal from the start/stop switch transitioning from a second state to the first state at least a predetermined number of times within a predetermined period.

15. The method of claim 14 wherein the predetermined number is an integer greater than two.

16. The method of claim 12 further comprising:
increasing the torque request in response to the first signal from the start/stop switch transitioning from the first state to a second state before the first signal is continuously in the first state for greater than the second predetermined period; and
as the torque request increases, increasing the torque output of the at least one of the engine and the electric motor.

17. The method of claim 16 further comprising:
continuing turning on and off the exterior hazard lights when:
the exterior hazard lights were being turned on and off prior to the first signal from the start/stop switch transitioning to the first state; and
the first signal from the start/stop switch transitions from the first state to the second state before the first signal is continuously in the first state for greater than the second predetermined period; and
maintaining the exterior hazard lights off when:
the exterior hazard lights were being maintained off prior to the first signal from the start/stop switch transitioning to the first state; and
the first signal from the start/stop switch transitions from the first state to the second state before the first signal is continuously in the first state for greater than the second predetermined period.

18. The method of claim 16 wherein:
decreasing the torque request includes decreasing the torque request by up to a first predetermined torque each first predetermined period; and
increasing the torque request includes increasing the torque request by up to a second predetermined torque each second predetermined period.

19. The method of claim 11 wherein the predetermined speed is greater than zero.

20. The method of claim 11 wherein selectively turning the exterior hazard lights on and off includes, independently of the second signal from the hazard light switch, selectively turning the exterior hazard lights on and off in response to the first signal from the start/stop switch being in the first state continuously for greater than the first predetermined period.

* * * * *